US012605688B2

(12) United States Patent
Malakooti et al.

(10) Patent No.: US 12,605,688 B2
(45) Date of Patent: Apr. 21, 2026

(54) AEROGEL FOAMS AND METHODS OF PREPARING THE SAME

(71) Applicant: BOARD OF REGENTS, THE UNIVERSITY OF TEXAS SYSTEM, Austin, TX (US)

(72) Inventors: Sadeq Malakooti, Richardson, TX (US); Hongbing Lu, Plano, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 596 days.

(21) Appl. No.: 18/007,400

(22) PCT Filed: Jul. 27, 2021

(86) PCT No.: PCT/US2021/070982
§ 371 (c)(1),
(2) Date: Jan. 30, 2023

(87) PCT Pub. No.: WO2022/027010
PCT Pub. Date: Feb. 3, 2022

(65) Prior Publication Data

US 2023/0277996 A1 Sep. 7, 2023

Related U.S. Application Data

(60) Provisional application No. 63/058,568, filed on Jul. 30, 2020.

(51) Int. Cl.
*C08J 9/28* (2006.01)
*B01J 13/00* (2006.01)

(52) U.S. Cl.
CPC ........... *B01J 13/0091* (2013.01); *C08J 9/286* (2013.01); *C08J 2201/054* (2013.01);
(Continued)

(58) Field of Classification Search
CPC ........ B01J 13/0091; B01J 3/008; C08J 9/286; C08J 2201/054; C08J 2205/026;
(Continued)

(56) References Cited

U.S. PATENT DOCUMENTS 5,686,031 A 11/1997 Coronado et al.
5,990,184 A * 11/1999 Biesmans .................. C08J 9/28
521/64
(Continued)

FOREIGN PATENT DOCUMENTS

WO WO-02074842 A1 * 9/2002 ......... C04B 38/0022
WO 2011/092149 A2 8/2011

OTHER PUBLICATIONS

Ganesan et al., "Design of aerogels, cryogels and xerogels of cellulose with hierarchical porous structures"; Materials and Design 92; 2016, pp. 345-355 (Year: 2016).*
(Continued)

*Primary Examiner* — K. Boyle
(74) *Attorney, Agent, or Firm* — Stanek Lemon Crouse & Meeks, PA

(57) ABSTRACT

Provided by the inventive concept are aerogel foams as solid materials including hierarchical porosity created by a foam-like structure embedded in the skeletal framework of a regular aerogel, methods of preparing the same without the presence and/or use of added chemical foaming agents, prefabricated templates, supercritical fluids and/or sacrificial chemicals, and methods of using the same.

12 Claims, 9 Drawing Sheets

Aerogel Foam Regular Aerogel

(52) U.S. Cl.
CPC .... *C08J 2205/026* (2013.01); *C08J 2205/044*
(2013.01); *C08J 2205/05* (2013.01); *C08J*
*2375/04* (2013.01)

(58) Field of Classification Search
CPC .............. C08J 2205/044; C08J 2205/05; C08J
2375/04; C08J 2201/0502; A61K 9/12
See application file for complete search history.

(56) References Cited

U.S. PATENT DOCUMENTS

| | | | |
|---|---|---|---|
| 8,105,512 B1 * | 1/2012 | Lucas | C01B 32/00 264/43 |
| 8,436,061 B2 | 5/2013 | Albert et al. | |

OTHER PUBLICATIONS

International Search Report and Written Opinion from PCT/US2021/070982 with International Filing Date Jul. 27, 2021, and mailed on Nov. 12, 2021, 9 pages.

V.A. Moshnikov et al. Investigation of Sol-Gel Derived Nanomaterials with a Hierarchical Structure. Glass Physics and Chemistry, 2011, vol. 37, No. 5, pp. 485-495, DOI: 10.1134/S1087659611050063, p. 488, left column, paragraph 3—right column, paragraph 3, figures 4, 5.

A.C. Pierre, History of Aerogels, in: Aerogels Handbook, Springer New York, New York, NY, 2011: pp. 3-18. https://doi.org/10.1007/978-1-4419-7589-8_1.

A.C. Pierre, A. Rigacci, SiO2 Aerogels, in: Aerogels Handb., Springer New York, New York, NY, 2011: pp. 21-45. https://doi.org/10.1007/978-1-4419-7589-8_2.

A.M. Kraynik, M.K. Neilsen, Elastic Behavior of Cellular Solids, in: Encycl. Mater. Sci. Technol., Elsevier, 2001: pp. 2387-2389. https://doi.org/10.1016/b0-08-043152-6/00421-6.

G. Wypych, Introduction, in: Handbook of Foaming and Blowing Agents, Elsevier, 2017: pp. 1-2. https://doi.org/10.1016/b978-1-895198-99-7.50003-9.

N. Teo, S.C. Jana, Open Cell Aerogel Foams via Emulsion Templating, Langmuir. 33 (2017) 12729-12738. https://doi.org/10.1021/acs.langmuir.7b03139.

N. Leventis, S. Mulik, X. Wang, A. Dass, V.U. Patil, C. Sotiriou-Leventis, H. Lu, G. Churu, A. Capecelatro, Polymer nano-encapsulation of templated mesoporous silica monoliths with improved mechanical properties, J. Non. Cryst. Solids. 354 (2008) 632-644. https://doi.org/10.1016/j.jnoncrysol.2007.06.094.

N. Teo, Z. Gu, S.C. Jana, Polyimide-based aerogel foams, via emulsion-templating, Polymer. 157 (2018) 95-102. https://doi.org/10.1016/j.polymer.2018.10.030.

S. Gu, S.C. Jana, Open cell aerogel foams with hierarchical pore structures, Polymer. 125 (2017) 1-9. https://doi.org/10.1016/j.polymer.2017.07.085.

C. Chidambareswarapattar, P.M. McCarver, H. Luo, H. Lu, C. Sotiriou-Leventis, N. Leventis, Fractal Multiscale Nanoporous Polyurethanes: Flexible to Extremely Rigid Aerogels from Multifunctional Small Molecules, Chem. Mater. 25 (2013) 3205-3224. https://doi.org/10.1021/cm401623h.

S. Donthula, C. Mandal, T. Leventis, J. Schisler, A.M. Saeed, C. Sotiriou-Leventis, N. Leventis, Shape Memory Superelastic Poly(isocyanurate-urethane) Aerogels (PIR-PUR) for Deployable Panels and Biomimetic Applications, Chem. Mater. 29 (2017) 4461-4477. https://doi.org/10.1021/acs.chemmater.7b01020.

S. Donthula, C. Mandal, J. Schisler, T. Leventis, M.A.B. Meador, C. Sotiriou-Leventis, N. Leventis, Nanostructure-Dependent Marcus-Type Correlation of the Shape Recovery Rate and the Young's Modulus in Shape Memory Polymer Aerogels, ACS Appl. Mater. Interfaces. 10 (2018) 23321-23334. https://doi.org/10.1021/acsami.8b06234.

T. Taghvaee, S. Donthula, P.M. Rewatkar, H. Majedi Far, C. Sotiriou-Leventis, N. Leventis, K—Index: A Descriptor, Predictor, and Correlator of Complex Nanomorphology to Other Material Properties, ACS Nano. 13 (2019) 3677-3690. https://doi.org/10.1021/acsnano.9b00396.

S. Min, J. Blumm, A. Lindemann, A new laser flash system for measurement of the thermophysical properties, Thermochim. Acta. 455 (2007) 46-49. https://doi.org/10.1016/j.tca.2006.11.026.

S. Malakooti, G. Qin, C. Mandal, R. Soni, T. Taghvaee, Y. Ren, H. Chen, N. Tsao, J. Shiao, S.S. Kulkarni, C. Sotiriou-Leventis, N. Leventis, H. Lu, Low-Cost, Ambient-Dried, Superhydrophobic, High Strength, Thermally Insulating, and Thermally Resilient Polybenzoxazine Aerogels, ACS Appl. Polym. Mater. 1 (2019) 2322-2333. https://doi.org/10.1021/acsapm.9b00408.

K. Sakai, Y. Kobayashi, T. Saito, A. Isogai, Partitioned airs at microscale and nanoscale: Thermal diffusivity in ultrahigh porosity solids of nanocellulose, Sci. Rep. 6 (2016) 1-7. https://doi.org/10.1038/srep20434.

D.P. Mohite, S. Mahadik-Khanolkar, H. Luo, H. Lu, C. Sotiriou-Leventis, N. Leventis, Polydicyclopentadiene aerogels grafted with PMMA: II. Nanoscopic characterization and origin of macroscopic deformation, Soft Matter. 9 (2013) 1531-1539. https://doi.org/10.1039/C2SM27606B.

Malakooti et al., "Scalable, hydrophobic and highly-stretchable poly(isocyanurate-urethank) aerogels," Royal Society of Chemistry, 2018, 8, pp. 21214-21223.

Smirnova et al., "Aerogels in Chemical Engineering: Strategies Toward Tailor-Made Aerogels," Annu. Rev. Chem. Biomol. Eng., 2017, 8, pp. 307-334.

Gurikov et al., "A novel approach to alginate aerogels: carbon dioxide induced gelation," The Royal Society of Chemistry, 2013, pp. 1-7.

Raman et al., "Hybrid alginate based aerogels by carbon dioxide induced gelation: Novel technique for multiple applicaions," J. of Supercritical Fluids, 106 (2015), pp. 23-33.

Leventis et al., "Nanoengineering Silica-Polymer Composite Aerogels with No Need for Supercritical Fluid Drying," Journal of Sol-Gel Science and Technology, 35, 2005, pp. 99-105.

Sahin et al., "Kinetics of Supercritical Drying of Gels," Gels, 2018, 4, 3, 29 pages.

* cited by examiner $(CH_2)_6NCO$ $OCN(H_2C)_6$     $(CH_2)_6NCO$

DESMODUR N3300A

$+$

HO——OH

ETHYLENE GLYCOL (EG)

DBTDL

$(CH_2)_6NH(CO)O\ R\text{-}$ $R\text{-}O(OC)HN(H_2C)_6$     $(CH_2)_6NH(CO)O\ R\text{-}$

POLY(ISOCYANURATE-URETHANE)
(PIR-PUR)

(1) PRESSURE VESSEL AS A GELATION MOLD
(2) HIGH PRESSURE BALL VALVE
(3) HIGH PRESSURE FLANGE
(4) HIGH PRESSURE AIR TANK
(5) AIR COMPRESSOR INLET

Aerogel Foam                    Regular Aerogel

FIG. 5A          FIG. 5B

(1) HIGH PRESSURE STEEL CAP
(2) PRESSURE VESSEL AS A GELATION MOLD
(3) HIGH PRESSURE BALL VALVE
(4) HIGH PRESSURE FLANGE
(5) HIGH PRESSURE AIR TANK
(6) PRESSURE GAUGE
(7) AIR COMPRESSOR INLET

1

AEROGEL FOAMS AND METHODS OF PREPARING THE SAME

RELATED APPLICATION DATA

The present application is a U.S.C. § 371 national phase application of PCT International Application No. PCT/US2021/070982 with international filing date of Jul. 27, 2021, which claims priority from and the benefit of U.S. Provisional Patent Application No. 63/058,568, filed Jul. 30, 2020, the disclosures of which are hereby incorporated herein by reference in their entireties.

STATEMENT OF GOVERNMENT SUPPORT

This invention was made with government support under Grant nos. CMMI1636306 and CMMI1661246 awarded by the National Science Foundation. The government has certain rights in the invention.

FIELD

The present inventive concept is related to aerogel foams and methods of preparing aerogel foams with hierarchical porosity in the absence of chemical foaming agents, supercritical fluids, sacrificial chemicals, and/or prefabricated templates.

BACKGROUND

Aerogels are a class of porous materials characterized by their low bulk density, high open porosity and high specific surface area [1]. They are typically synthesized through a sol-gel process at atmospheric pressure followed by drying of the resulting wet-gels with a supercritical fluid (SCF), most commonly $CO_2$ [1, 2]. On the other hand, solid foams are a different class of porous materials formed by pockets of gas trapped in a solid matrix, often again characterized by low bulk densities and high macroporosity [3]. Foaming is an important industrial process, which typically provides lighter and more cost-effective materials than in their non-foam state [4]. The result of an aerogel foaming process, which we refer to as an "aerogel foam," merges the open porosity of an aerogel with the "closed" porosity of foams, creating a multiscale, random, yet hierarchical open-pore structure, in which larger voids (pores) are interconnected in all directions (3D) by the innate aerogel pores. Existing manufacturing techniques utilize chemical foaming agents and methods involving aerogel synthesis within the macropores of prefabricated polymer templates, resulting in extremely specific and quite costly procedures not suitable for the industrial scale [5-7]. These procedures can involve large amounts of sacrificial chemicals and therefore are expensive [6, 8].

In view of these shortcomings in existing manufacturing techniques, there remains a need for aerogel foams with improved characteristics, and improved methods of preparing aerogel foams.

SUMMARY

According to the inventive concept, provided are aerogel foams as solid materials with hierarchical porosity created by a foam-like structure embedded in the skeletal framework of a regular aerogel. These foam-like structures are prepared without chemical foaming agents or templates, resulting in a less expensive, more efficient, and more readily adaptable process.

In an aspect of the inventive concept, provided is a method of preparing an aerogel foam including: subjecting a sol formulation suitable for forming an aerogel to pressure and gradually depressurizing the sol formulation overtime, to provide an aerogel foam comprising a hierarchical porosity.

In another aspect of the inventive concept, provided is an aerogel foam including a hierarchical porosity, wherein the aerogel foam is free of added chemical foaming agents, sacrificial chemicals, prefabricated templates, or any combination thereof.

In yet another aspect of the inventive concept, provided is a structure including an aerogel foam according to the inventive concept, and/or an aerogel foam prepared by methods according to the inventive concept.

DETAILED DESCRIPTION

Figures 1A, 1B:
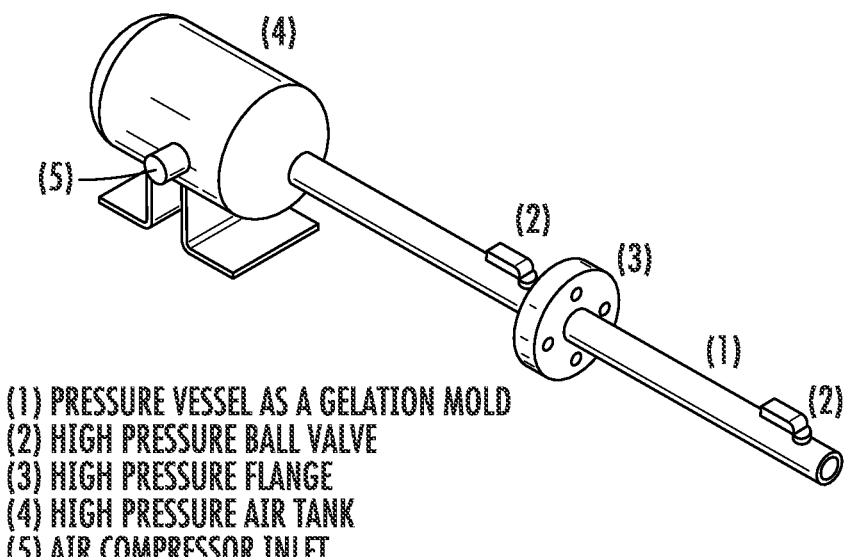
FIG. 1A depicts the reaction pathway in the preparation of poly(isocyanurate-urethane) aerogels (PIR-PUR).
FIG. 1B depicts a schematic of a pressure vessel used as a mold for preparing aerogel foams according to the inventive concept.

In the following detailed description, embodiments of the present inventive concept are described in detail to enable practice of the inventive concept. Although the inventive concept is described with reference to these specific embodiments, it should be appreciated that the inventive concept can be embodied in different forms and should not be construed as limited to the embodiments set forth herein. Rather, these embodiments are provided so that this disclosure will be thorough and complete, and will fully convey the scope of the inventive concept to those skilled in the art. All publications cited herein are incorporated by reference in their entireties for their teachings. Unless otherwise defined, all technical terms used herein have the same meaning as commonly understood by one of ordinary skill in the art to which this disclosure belongs.

The term "comprise," as used herein, in addition to its regular meaning, may also include, and, in some embodiments, may specifically refer to the expressions "consist essentially of" and/or "consist of." Thus, the expression "comprise" can also refer to embodiments, wherein that which is claimed "comprises" specifically listed elements does not include further elements, as well as embodiments wherein that which is claimed "comprises" specifically listed elements may and/or does encompass further elements, or encompass further elements that do not materially affect the basic and novel characteristic(s) of that which is claimed.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the presently disclosed subject matter. For example, the term "about," when referring to a value can be meant to encompass variations of, in some embodiments ±100%, in some embodiments ±50%, in some embodiments ±20%, in some embodiments ±10%, in some embodiments 5%, in some embodiments ±1%, in some embodiments ±0.5%, and in some embodiments 0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

The inventive concept includes numerous alternatives, modifications, and equivalents as will become apparent from consideration of the following detailed description.

In embodiments of the inventive concept, provided are aerogel foams as solid materials with hierarchical porosity created by a foam-like structure embedded in the skeletal framework of a regular aerogel. The foam-like structure is prepared without chemical foaming agents or templates, resulting in a less expensive, more efficient, and more readily adaptable process. Specifically, pressurized air, for example, pressurized to about 7 bar, is injected into a suitable sol, such as a sol suitable for forming an aerogel, which is allowed to gel under pressure, followed by slow depressurization. Voids are created from the air bubbles formed during depressurization. In some embodiments, aerogel foams of the inventive concept are based on poly (isocyanurate-urethane) aerogels (PIR-PUR) with superior material properties compared with those of their pristine (conventional) aerogel counterparts. With an eye on scalability, all wet-gels were dried under ambient conditions. In embodiments of the inventive concept, aerogel foams exhibit lower bulk densities by about 25%, and higher porosities by about 10% in comparison with conventional PIR-PUR aerogel counterparts. Furthermore, thermal conductivities of aerogel foams were found to be reduced significantly, for example, reduced by about 25%, from 0.104 to 0.077 $Wm^{-1}K^{-1}$, compared to the corresponding conventional aerogels. In addition, aerogel foams absorb 36% w/w more oil and show better oil retention in comparison with conventional PIR-PUR aerogel samples made from the same sols. As methods of preparing aerogel foams according to the inventive concept do not alter the chemical composition/components of the sol formulation for preparing aerogels or aerogel foams, method according to the inventive concept can be used in a variety of different types of aerogels and formulations in order to lower their bulk density and improve desired physical properties, such as thermal conductivity.

An "aerogel" may be described as an open-cell or open-pored, significantly "microporous" (having pores less than about 2 nm, or micropores) or "mesoporous" (having pores between about 2 and about 50 nm, or mesopores) structure or material, generally exhibiting a porosity of greater than about 50%.

"Macropores" and/or "macroporous," or having a macroporous structure, such as in an aerogel or aerogel foam, may be described as a structure having pores, i.e., macropores, of greater than about 50 nm in size.

An "aerogel foam," according to some embodiments of the inventive concept, may describe a material having a multiscale, random, yet hierarchical open-pore structure, in which larger voids (e.g., macropores) are interconnected in all directions (3D) by smaller, innate aerogel pores (e.g., micropores and mesopores).

"Porosity" or "void fraction" may be described as a percentage/fraction of non-solid volume of a material, such as in an aerogel or aerogel foam. For example, an aerogel or aerogel foam having a porosity of about 90% has a non-solid volume of about 90% and a solid volume of about 10%. Porosity of aerogel foams, such as aerogel foams prepared according to methods of the present inventive concept include aerogel foams having a porosity of greater than, or at least, about 50%, about 55%, about 60%, about 65%, about 70%, about 75%, about 80%, about 85%, about 90%, about 95%, about 99%, about 99.5%, up to about 99.8% or even 99.9%, or greater, porosity.

An "open-cell" and/or "open-pore" structure, or a structure having "open porosity" may be described as a structure having, for example, microporous, mesoporous and/or macroporous voids/pores, that are interconnected in all directions and open/connected to the air/atmosphere/environment surrounding the structure. Aerogel foams, such as aerogel foams prepared according to methods of the present inventive concept, may include a porosity having a percentage/fraction open porosity of greater than, or at least, about 50%, about 55%, about 60%, about 65%, about 70%, about 75%, about 80%, about 85%, about 90%, about 95%, about 99%, about 99.5%, up to about 99.8% or even 99.9%, or greater open porosity.

An aerogel foam/structure/material having "hierarchical porosity" may be described as an aerogel foam/structure/ material having a combination of pores of differing sizes, for example, having a combination of macropores and meso- and/or micropores.

A "closed-cell" and/or "closed-pore" structure, or a structure having "closed porosity" may be described as a structure having pores closed to one another and to the air/atmosphere/environment surrounding the structure.

"Innate" and/or "pristine," as used in describing an aerogel, aerogel structure, and/or aerogel properties, may describe an aerogel, aerogel structure, and/or aerogel properties having conventional aerogel, conventional aerogel structure, and/or having conventional aerogel properties. It may also be used in describing an aerogel and/or aerogel structure prepared by conventional methods, for example, using conventional gelation and/or aging techniques, for example, gelation and/or aging techniques performed in the absence of added pressure, such as at atmospheric or ambient pressures.

Methods of Preparing Aerogel Foams

Embodiments of the present inventive concept include methods of preparing aerogel foams. The elements for methods of the inventive concept may include using any sol formulation suitable for forming an aerogel as would be appreciated by one of skill in the art. The sol formulation may include any combination of precursors and suitable catalysts for polymerization/gelation of the precursors in the sol formulation as would appreciated by one of skill in the art.

The precursor(s) in the sol formulation for preparing the aerogel foams according to embodiments of the inventive concept are not particularly limited, and may be any precursors used in preparing conventional aerogels, for example for preparing aerogels from: silica; metal oxides; organic polymers, e.g., resorcinol-formaldehyde, phenol-formaldehyde, polyacrylates, polystyrenes, polyisocyanurates, polyurethanes, epoxies, and any combinations thereof; biological polymers, e.g., gelatin, pectin, and agar; semiconductor nanostructures, e.g., cadmium selenide; carbon; carbon nanotubes; and metals, e.g., copper and gold, or any other suitable precursor(s) as would be appreciated by one of skill in the art.

The catalyst(s) in the sol formulation for preparing the aerogel foams according to embodiments of the inventive concept are similarly not particularly limited, and may be of any nature, for example, acidic (e.g., hydrochloric acid, acetic acid), basic (e.g., amines), etc., or any other suitable catalyst as would by appreciated by one of skill in the art.

In an embodiment, the precursors of the sol formulation suitable for forming an aerogel may include an aliphatic triisocyante, such as Desmodur N3300A, and ethylene glycol, and the catalyst may be dibutylin dilaurate.

Additionally, in embodiments of the present inventive concept, the sol formulation suitable for preparing aerogel foams is free of sacrificial chemicals, for example, chemical foaming agents, and prefabricated templates including macropores within which aerogel formation takes place. Specifically, sacrificial chemicals or materials include any matter that has to be removed after the foaming process. Examples of inorganic chemical foaming agents include sodium bicarbonate, ammonium carbonate, ammonium bicarbonate, and calcium azide. Examples of organic foaming agents include azodicarbonamide, hydrazocarbonamide, benzenesulfonyl hydrazide, dinitrosopentamethylene tetramine, toluenesulfonyl hydrazide, p,p'-oxybis(benzene-sulfonylhydrazide), azobisisobutyronitrile, and barium azodicarboxylate.

The sol formulation suitable for preparing an aerogel or aerogel foam, according to conventional methods, may undergo a gelation step and an aging step. A "gel" is generally formed by a three-dimensional continuous network, which includes the joining of polymer chains. Aging of the gel is an extension of the gelation step in which the gel network is generally reinforced by additional polymerization. The gelation step and aging step, according to conventional methods, takes place at atmospheric/ambient pressure. In contrast, according to methods of the inventive concept, the sol formulation after combining and mixing of components of the of the formulation, e.g., following gelation step and during part of or all of the aging step, is subjected to pressure. Subjecting the formulation to pressure may include aging the formulation under pressure in, for example, a pressure vessel at a pressure greater atmospheric/ambient pressure. In some embodiments, the pressure vessel in which the sol formulation is subjected to pressure may serve as a mold for the aerogel foam. The pressure that the sol formulation is subjected to may be, for example, about 3 bar, about 4 bar, about 5 bar, about 6 bar, about 7 bar, about 8 bar, about 9 bar, about 10 bar, or even greater than 10 bar, or any pressure between about 3 bar and about 10 bar.

The period of time that the sol formulation is subjected to pressure during aging is also not particularly limited, and may be any aging time that may be appreciated by one of skill in the art. In some embodiments, the aging time is about four times that gelation time. In some embodiments, the aging time may be, for example, about 30 minutes, about 1 hour, about 1.5 hours, about 2 hours, about 2.5 hours, or about 3 hours, or any period of time between about 30 minutes and about 3 hours.

Following aging under pressure, the sol formulation may be depressurized to bring the pressure on the sol formulation back to atmospheric/ambient pressure. depressurizing of the formulation may be performed gradually over a period of time and in stages/steps. For example, the sol formulation may be depressurized over a period of about 30 minutes, about 45 minutes, about 60 minutes (1 hour), about 1.5 hours, or about 2 hours, or any period of time between about 30 minutes to about 2 hours.

Rather than continuously depressurizing the sol formulation over the period of time, in embodiments of the inventive concept, the sol formulation may be depressurized in stages/steps. the number of stages/steps and the amount the sol formulation is depressurized in each step is not particularly limited. For example, the sol formulation may be depressurized in about 4 stages/steps, 5 stages/steps, 6 stages/steps, 7 stages/steps, 8 stages/steps, 9 stages/steps, 10 stages/steps, or greater than about 10 stages/steps. In some embodiments, the amount that the sol formulation is depressurized in each stage/step may be about an equal amount of pressure for each stage/step. In some embodiments, the amount of pressure that the sol formulation is depressurized in each stage/step may increase for each stage/step. In some embodiments, the amount of pressure that the sol formulation is depressurized in each stage/step may decrease for each stage/step. In other embodiments, the amount of pressure that the sol formulation is depressurized in each stage/step may vary in any amount, increasing or decreasing, without limitation. Additionally, the time between each depressurization stage/step is not particularly limited. For example, the sum of the time between each depressurization stage/step, and any time taken for each depressurization stage/step, may correspond to the period of time over which the sol formulation is brought back to atmospheric/ambient pressure. In some embodiments, the time between each depressurization stage/ step may be equal. In some embodiments, the time between each depressurization stage/step may increase. In some embodiments, the time between each depressurization stage/step may decrease. In other embodiments, the time between each depressurization stage/step may vary in any amount, increasing or decreasing, without limitation.

Following depressurizing back to atmospheric/ambient pressure, the resulting gel/aerogel foam may be subjected to solvent exchange, for example by removing the gel/aerogel foam from the pressure vessel/mold into a solvent, for example, a mixture of acetone/acetonitrile, acetone, acetonitrile, or pentane. The solvent exchange may be performed more than once, and with any one of a mixture of acetone/acetonitrile, acetone, acetonitrile, pentane for a period of time, for example, about 8 hours in each bath. After solvent exchange, for example, after solvent exchange into pentane, the gel/aerogel foam may be dried, for example, at room temperature under ambient pressure, followed by placing the samples in a convection oven at 50° C. for 2 h.

Aerogel Foam Material and Microstructural Properties

Other embodiments of the inventive concept include aerogel foams with improved physical characteristics over conventional counterparts. For example, in some embodiments, provided is an aerogel foam including a hierarchical porosity. In some embodiments, the aerogel foams of the inventive concept are free of sacrificial chemicals, for example, chemical foaming agents, supercritical fluids, such as supercritical $CO_2$, and/or prefabricated templates typically used for preparing materials/structures with a hierarchical porosity including macropores within which aerogel formation takes place.

The aerogel foams of the present inventive concept, for example, aerogel foams including a hierarchical porosity, prepared by methods of the inventive concept as set forth herein, can have superior physical characteristics when compared to conventional aerogels prepared in a convention manner using the same sol formulation. Superior characteristics of the aerogel foams of the inventive concept may include, for example, lower bulk density, and lower thermal conductivity, and/or greater porosity when compared to conventional aerogels prepared from the same sol formulation in a conventional manner.

In some embodiments, the hierarchical porosity of the aerogel foams of and aerogel foams prepared by methods of the present inventive concept may include macropores (pores greater than about 50 nm in size), and mesopores (pores between about 2 nm and about 50 nm in size) and/or micropores (pores less than about 2 nm in size), including a hierarchical porosity of any one of these pore sizes. For example, an aerogel foam comprising a hierarchical porosity may include, in some embodiments, a bimodal size distribution including, for example, macropores of about 25 μm in size and about 2 m in size.

Other embodiments in which the aerogel foams of the present inventive concept may exhibit superior physical characteristics may include, for example, superior ability/capacity to absorb, for example, gases and/or oil, release, for example, chemicals such as air fresheners or mosquito repellant, fractionate blood, or filtering, for example, blood, in hemodialysis, etc., when compared to conventional aerogels or products, for example, prepared from the same sol formulation in a conventional manner. For example, in some embodiments, the aerogel foams of the present inventive concept may have superior ability to absorb oil (i.e., oil-spill cleaning) and/or capture carbon dioxide than the comparable conventional aerogel prepared according to conventional methods.

Having described various aspects of the present inventive concept, the same will be explained in further detail in the following examples, which are included herein for illustration purposes only, and which are not intended to be limiting to the inventive concept.

EXAMPLES

Our approach for the synthesis of aerogel foams without the use of chemical agents or templates involves gelation under high pressure through air injection into a specially designed mold. High pressure induces air dissolution into the sol, which generates bubbles and creates a foam-like structure during depressurization. Our procedure does not alter the chemical composition of the aerogel, so it could potentially be used for a variety of different aerogel types and formulations. Therefore, without loss of generality, the method is demonstrated here with a special type of a poly(isocyanurate-urethane) aerogel (PIR-PUR) [9,10]. The newly synthesized aerogel foams were characterized in terms of bulk density, porosity, thermal conductivity and oil absorption capabilities in comparison with their regular aerogel counterparts prepared from the same sol under atmospheric pressure.

Results and Discussion

1. Pressurized Sol-Gel Synthesis of PIR-PUR Aerogel foams

Figure 1C:
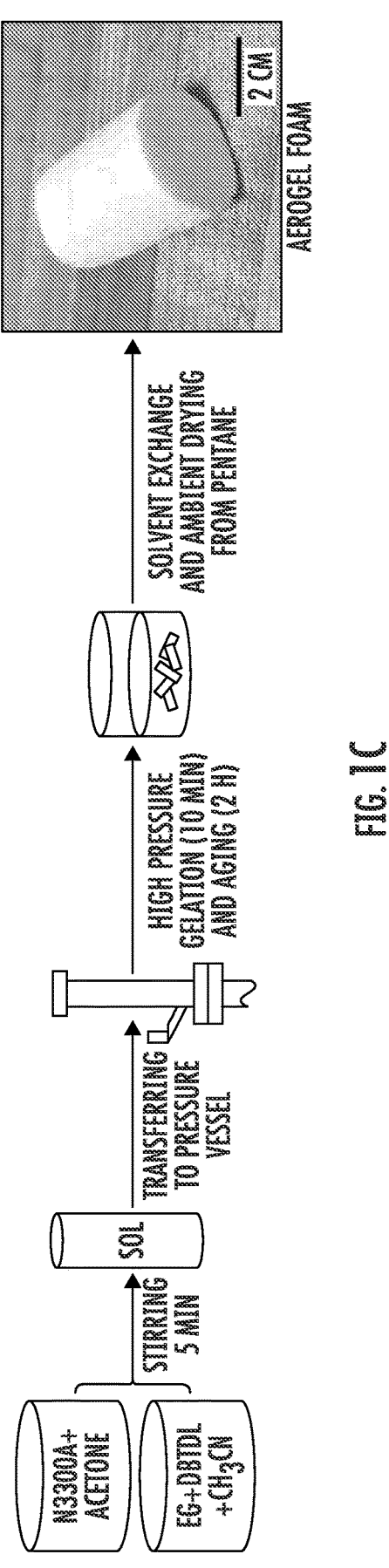
FIG. 1C depicts an exemplary preparation procedure of PIR-PUR aerogel foams according to the inventive concept.
Figure 8:
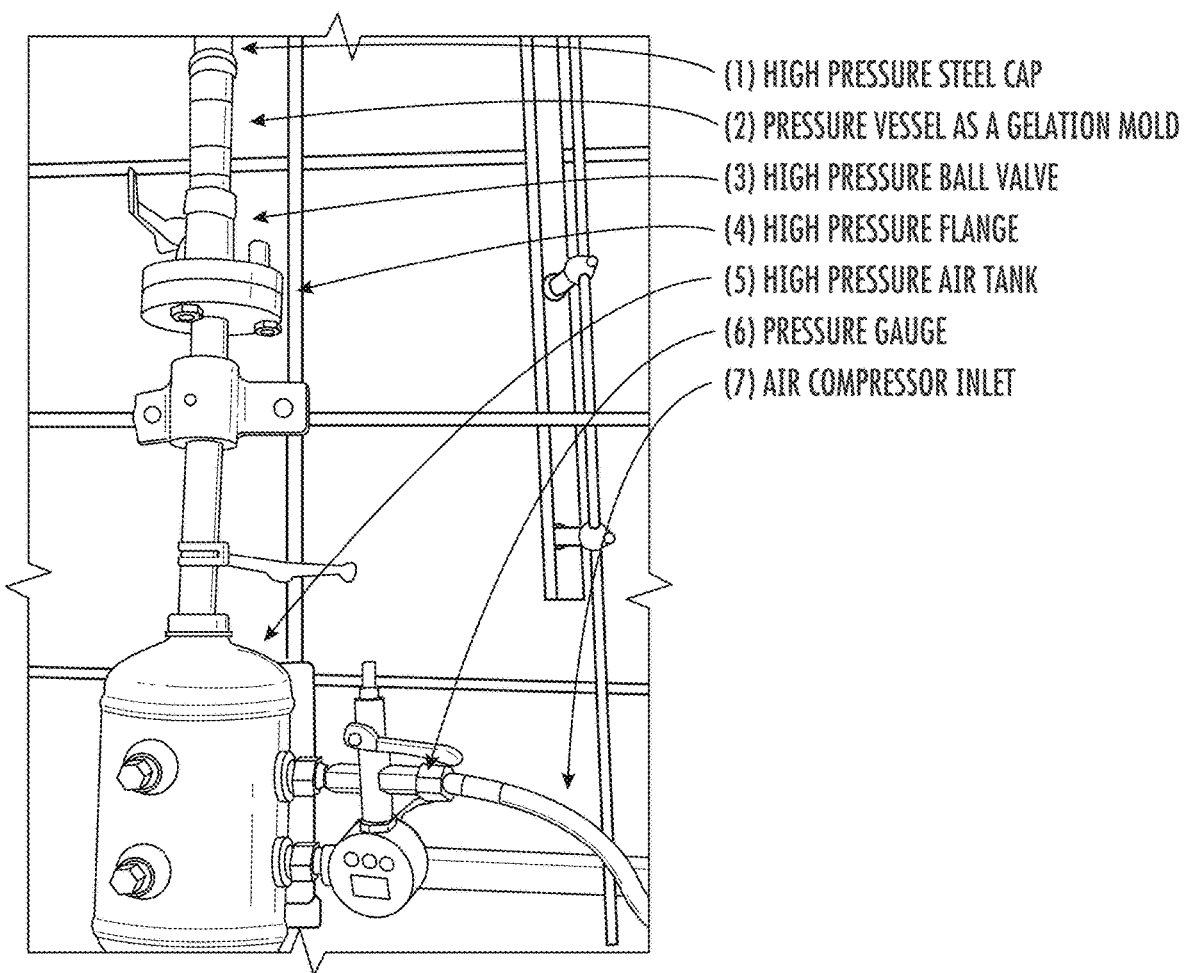
FIG. 8 is a depiction of the pressure vessel used as a mold for the preparation of PIR-PUR aerogel foams according to the inventive concept.

The sol formulation (FIG. 1A) was adopted from Donthula et al. [10]. An aliphatic triisocyanate (Desmodur N3300A) and ethylene glycol (EG) were separately dissolved in anhydrous acetone and acetonitrile (the exact ratios are listed in Table 1). A schematic of the pressure vessel and the synthetic protocol are shown in FIGS. 1B and 1C, respectively. A photograph of the pressure mold is shown in FIG. 8 of the Supporting Information. The two solutions were combined and stirred for 5 min at room temperature. Next, the correct amount of catalyst (dibutyltin dilaurate; DBTDL, see Table 1) was added, and the resulting sol was stirred for an additional 5 min. Subsequently, the sol was poured into the gelation vessel, which was then pressurized with air to 7 bar, and it was allowed to gel and age for 2 h at room temperature. A portion of the same sol (5 mL) was set aside in an unpressurized clear syringe for comparison. Both kinds of gels were post-processed in the same way. After aging, the high-pressure ball valve (see FIG. 1B) was loosened and tightened repeatedly to allow the vessel to gradually depressurize in stages. The sample was allowed to equilibrate for several minutes during each depressurization step. The total depressurization process lasted for approximately 45 min, and finally the gel was removed from the mold into an acetone-acetonitrile mixture. The gelation solvent was exchanged one more time with acetone, then with acetonitrile and finally with pentane for a period of 8 h in each bath. Those wet-gels were dried directly from pentane at room temperature under ambient pressure. The drying process was completed by placing the samples in a convection oven at 50° C. for 2 h.

2. General Material and Microstructural Properties

The general material properties such as skeletal densities, bulk densities and porosities are listed in Table 2. The bulk densities were calculated from the sample dimensions and masses. The regular PIR-PUR aerogel sample (gelled under atmospheric pressure) had a bulk density of 0.345 g/cm³. At the same monomer concentration, foamed samples had about 30% lower bulk densities, as low as 0.247 g/cm³. As expected, the skeletal densities of the foamed samples were close to the skeletal density of the regular aerogel sample. Linear shrinkage was calculated by comparing the diameters of the samples with the inner diameter of the molds and it was found similar (at about 20%) between the regular and foamed samples. No significant syneresis was observed during gelation and aging. For all samples, the main shrinkage event took place during the ambient-pressure drying process. Porosities were calculated using the bulk and skeletal densities. Following the trend in bulk densities, the pressurized sol-gel approach increased the porosity by approximately 10%.

Figure 2:
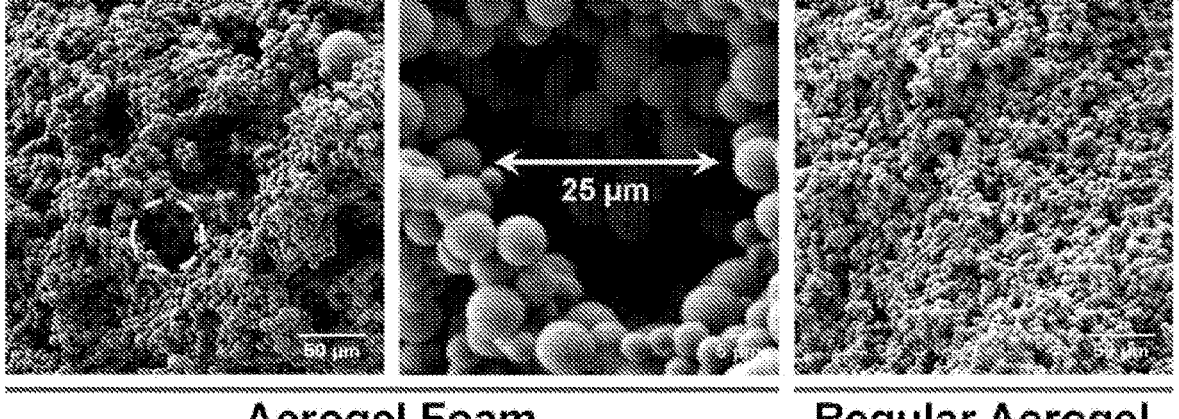
FIG. 2 depicts scanning electron micrographs (SEM) images of an aerogel foam (PIR-PUR-P1 sample) according to the inventive concept in comparison with a conventional PIR-PUR aerogel.
Figure 7:
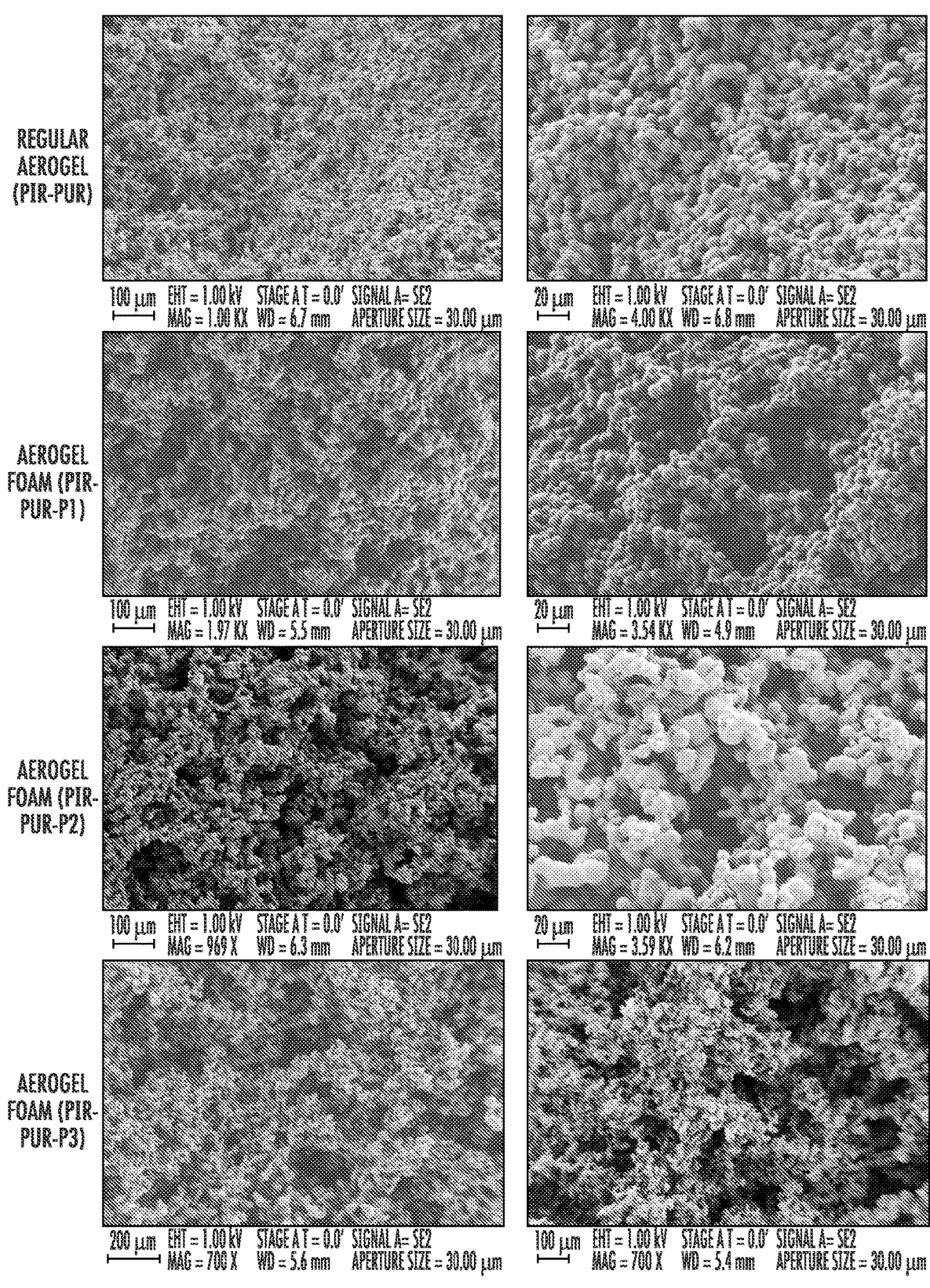
FIG. 7 depicts SEM images of a conventional aerogel (PIR-PUR) and aerogel foams according to the inventive concept (PIR-PUR-P1, PIR-PUR-P2 and PIR-PUR-P3) different magnifications.

The morphology of the foamed samples was studied using scanning electron microscopy (SEM, FIG. 2 and FIG. 7). It is immediately apparent that the skeletal particle size of the regular aerogel and the aerogel foam were approximately equal, and therefore it was concluded that the mechanism of particle formation (phase separation of liquid oligomers, followed by spherodization and solidification [11,12]) was not affected by the sol pressurization.

Figure 3:
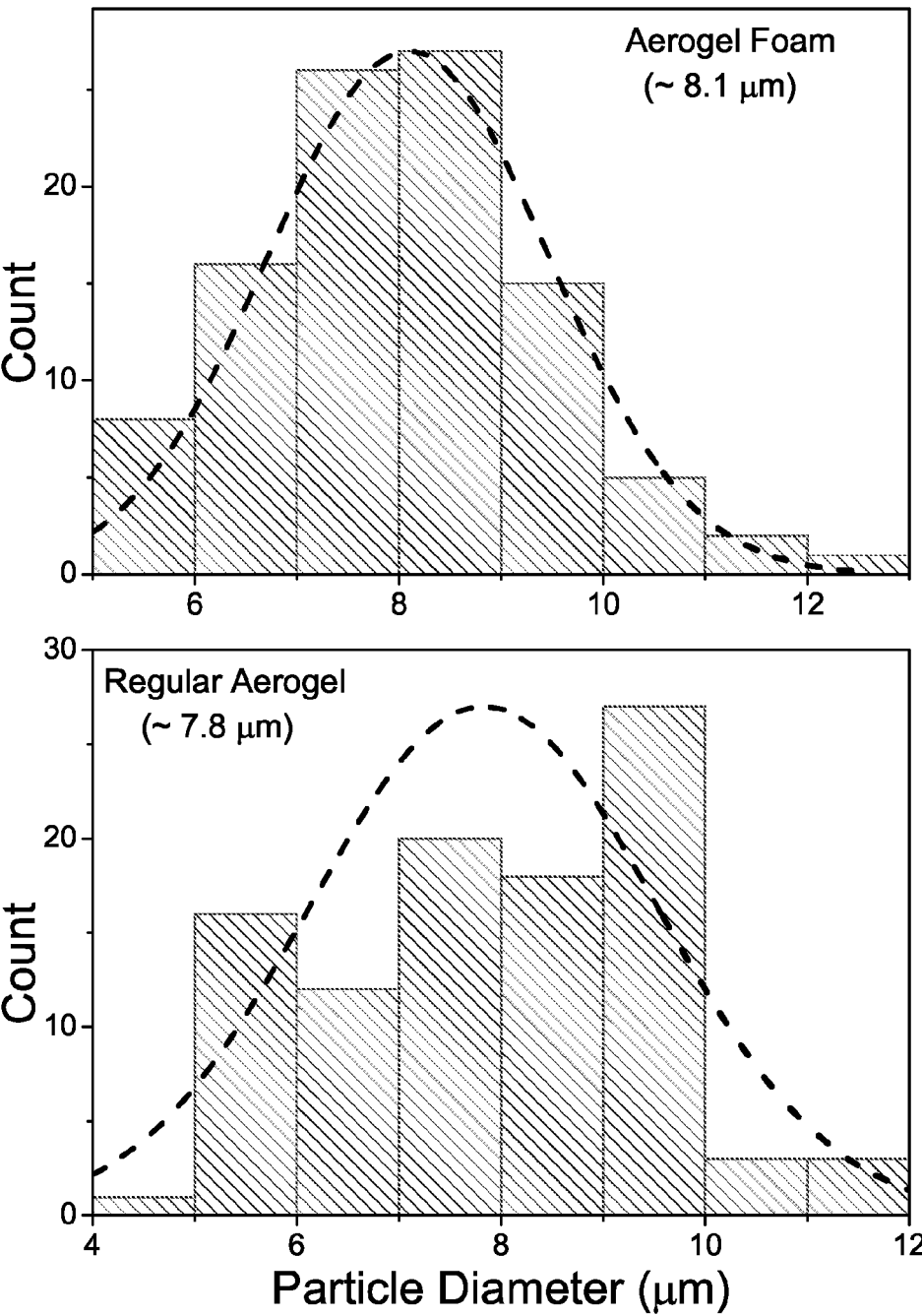
FIG. 3 depicts particle size distribution of an PIR-PUR aerogel foam according to the inventive concept (top) with that of a conventional PIR-PUR aerogel (bottom).

Quantitatively, several random particles were selected from the SEM images and the particle diameters were used in order to construct the particle size distribution curves of FIG. 3. The particle size distribution in the aerogel foam was slightly broadened compared to that of the regular aerogel samples. However, the average particle diameter of both types of aerogels was close to 8 μm.

The air dissolved in the sol during gelation formed bubbles during depressurization, leading to the formation of microvoids surrounded by the pore structure of the regular aerogel. Based on FIG. 2, the size of a typical macrovoid was around 25 μm. It is believed that the size of the macrovoids is be related to the magnitude of the applied pressure.

Figure 4:
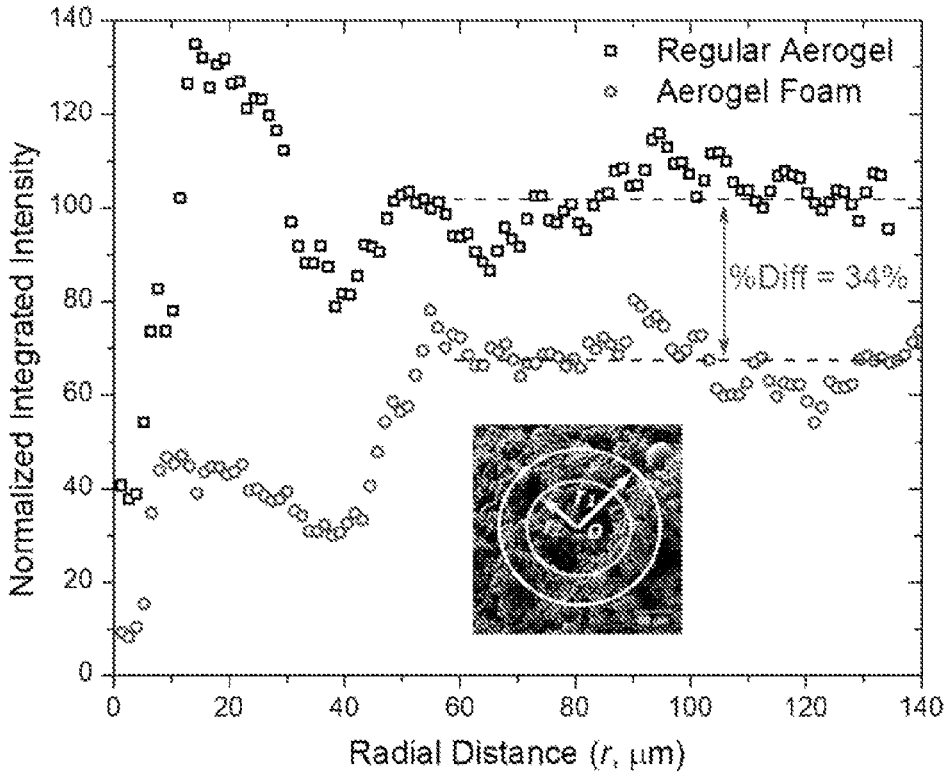
FIG. 4 depicts normalized integrated intensities for an aerogel foam according to the inventive concept (PIR-PUR-P1, circles) and a conventional aerogel (squares) as a function of radial distance, r, from a randomly selected center point (O) in the SEMs—see Inset. (Data are used to quantify void space distribution).

In order to quantify the effect of the pressurized gelation on the pore morphology of aerogel foams versus that of a regular aerogel, the SEM images in FIG. 2 were analyzed using the ImageJ software package (Radial Profile Plot) [13] as follows (see FIG. 4): First, the integrated intensity at a given distance from a randomly selected reference point was defined by the sum of the pixel values around a circle with the reference point as its center and the given distance as its radius (see FIG. 4, Inset); Subsequently, the integrated intensities were divided by the number of pixels in the circle to obtain the normalized integrated intensities. Of course, for this analysis to be valid, the SEM images had to be captured at the same magnification, same brightness, same exposure time, etc. The normalized integrated intensities were used as indicators of the radial particle distribution as a function of the radial distance from the center point of the SEM images. According to FIG. 4, there is a distinct peak in the radial profile of the regular PIR-PUR aerogels at 10 to 20 μm. With 8 μm average particle diameter (see above), this peak shows that aerogel particles, and therefore the porous space created in between, are distributed evenly at the vicinity of the center point of the SEM image. Since the selection of the center point was random, this assertion is valid for the entire material. This conclusion is consistent with the SEM image of the regular aerogels (FIG. 2). However, this picture is no longer valid in the aerogel foams: as data of FIG. 4 show, in that case we have three microvoids around the SEM center point. Interestingly, the radial profiles of both the regular aerogel and the aerogel foam are converging as the sampling radius increases above 60 μm. However, the converging intensity value of aerogel foams is 34% lower than the corresponding value of a regular aerogel. That percent difference between the converged intensities is in the same range as the percent difference of bulk densities between regular PIR-PUR aerogel and aerogel foams. This observation indicates that the normalized integrated intensities can be used to quantify morphology related differences in nanostructured materials.

3. Thermal Properties

Figure 5:
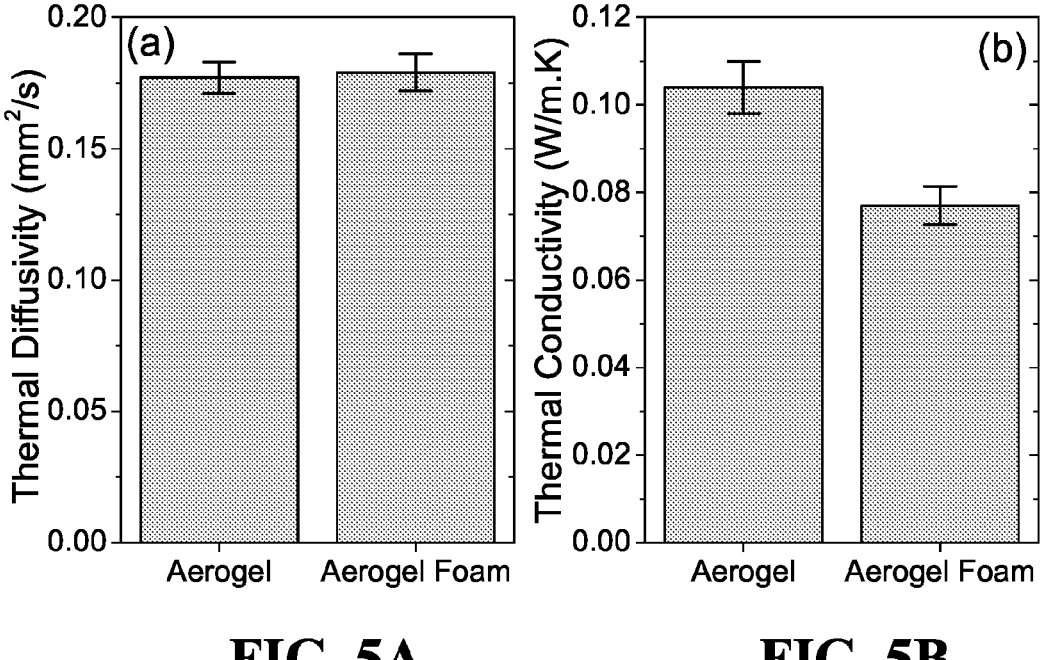
FIG. 5A depicts the average thermal diffusivity and FIG. 5B depicts the average thermal conductivity of a conventional PIR-PUR aerogel compared with aerogel foams according to the inventive concept at room temperature.

The thermal diffusivities, R, of a regular aerogel and aerogel foams were measured using the laser flash method as a non-contact, non-destructive, and highly accurate method [14, 15]. The R values are listed in Table 3. Due to the increase in porosity and the presence of new voids in the aerogel foams relative to the regular aerogel, the air thermal diffusivity is expected to be higher in aerogel foams relative to regular aerogels. However, that increase in thermal diffusivities is apparently moderated by a reduction of the amount of solid material in the skeletal framework, and as a result the thermal diffusivities of the two materials remain within error about equal to one another (FIG. 5a). Thermal conductivities (k) were then calculated from the corresponding thermal diffusivities (R) using the relationship $k=R\times c_p\times \rho_b$, where $c_p$ and $\rho_b$ are the specific heat capacity and the bulk density, respectively. Here, the specific heat capacity was considered equal for all materials ($1.711\pm0.074$ g$^{-1}$ K$^{-1}$) [11]. The thermal conductivities of the regular aerogel and aerogel foams are included in Table 3. Signifying the significance of the solid network contribution, the thermal conductivities of the aerogel foams were significantly lower (by 25%) compared to the corresponding values of regular aerogels prepared with the same monomer concentration (FIG. 5b). This further underlines the fact that heat transfer between pore-filling air and the PIR-PUR walls of the aerogel foam is negligible [16]. Therefore, with a significant reduction in bulk density (about 30%), the heat transfer contribution of the PIR-PUR phase is significantly reduced and subsequently the total thermal conductivity in the aerogel foams is also reduced proportionally compared to the regular aerogel.

4. Oil Absorption Properties

Figure 6:
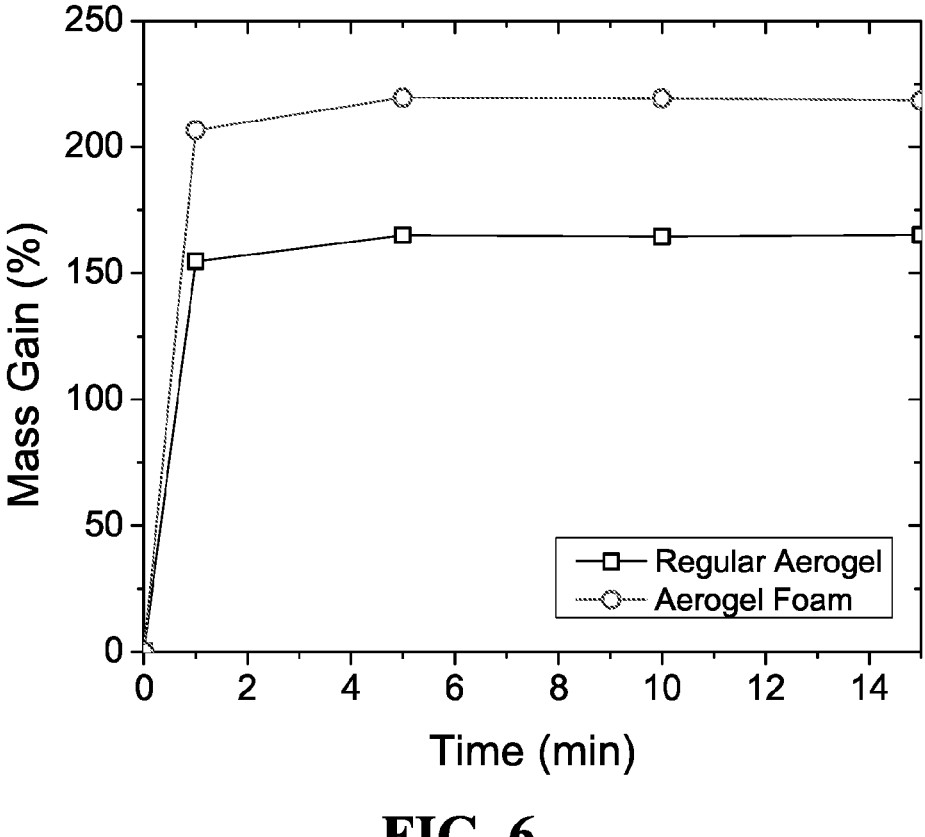
FIG. 6 depicts percent mass gain an aerogel foam of the inventive concept (PIR-PUR-P1, circles) and a conventional aerogel (squares) upon submerging in engine oil as a function of time.

FIG. 6 shows the percent mass gain of the regular aerogel and aerogel foam (PIR-PUR-P1) as a function of time when corresponding samples were submerged in engine oil. The aerogel foam shows a peak mass gain of 219%, which was reached in a little over 1 min. The peak mass gain for regular aerogel was 165%, which was reached at roughly the same time. Both samples maintained this peak mass gain. However, as it was expected, due to the higher porosity of aerogel foams, those samples were 36% more absorbent than the regular aerogel samples. In fact, that increase in oil absorption capacity far exceeds the increase in porosity (10%), which might be attributed to greater swelling due to lower density. It is interesting to note that aerogel foams released a minimal amount of oil during the experiments, whereas the regular aerogel sample released a significantly larger volume of oil. Thus, aerogel foams demonstrate better oil retention and absorption than regular aerogels.

CONCLUSIONS

In summary, polymeric aerogels with foam-like porosity surrounded by regular structural characteristics of the corresponding aerogels were prepared using a pressurized sol-gel approach. The procedure of injecting high-pressure air into the gelation vessel containing a proper sol is indeed an environmentally friendly and low-cost method for the foaming process in producing aerogel foams. Aerogel foams exhibited significantly lower bulk density, higher porosity, and lower thermal conductivity compared to their regular aerogel counterparts. With aerogels demonstrating applications such as oil-spill cleaning, $CO_2$ capturing, blood fractionating, air freshener release, mosquito repellant release, hemodialysis, filtration of urine and so on, aerogel foams will demonstrate further quantitative improvements in all these applications.

Experimental

Materials: Acetone, acetonitrile, and ethylene glycol were obtained from Fisher Scientific (Hampton, NH). Desmodur N330A was supplied by Covestro (Pittsburgh, PA). Dibutyl-tin dilaurate, 95% (DBTDL) was obtained from Alfa Aesar (Haverhill, MA). Five-millimeter plastic vials were used as molds. All purchased materials were used without further processing.

Setup for gelation underpressure: A 6" threaded steel pipe was attached to a high-pressure vessel via a ball valve and a flange. The other end was closed with a steel cap. An air compressor was attached to the vessel through a pressure gauge. To reach higher pressures, a more powerful air compressor was attached to the gauge. FIG. 8 shows the setup for the pressurized so-gel synthesis. The sol is poured into the steel pipe when the ball valve is closed and then sealed with the steel cap. The total volume of the gelation vessel is roughly 100 mL. A total of 90 mL sol was used to allow space for the expansion of the pressurized sample.

Synthesis: Monomeric compounds Desmodur N3300A and ethylene glycol were dissolved separately in acetone and acetonitrile (exact amounts are listed in Table 1). The two solutions were combined and stirred for 5 minutes at room temperature. Dibutyltin dilaurate catalyst was then added, and the solution was stirred for an additional 5 min. The solution was poured into the gelation vessel, where it was pressurized with an air compressor and allowed to gel and age for 2 h at room temperature. For sample removal, the cap of the gelation vessel was loosened and tightened repeatedly to allow gradual depressurization in stages. The sample was allowed to equilibrate for several minutes during each Basic material characterization: Bulk densities ($\rho_b$) were determined from the weight and the physical dimensions of the samples. Skeletal densities ($\rho_s$) were determined with helium pycnometry using a Micromeritics AccuPyc II 1340 instrument. Samples for skeletal density measurements were outgassed for 24 h at room temperature under vacuum before analysis. Porosities ($\Pi$) as a percent of empty space were determined from the $\rho_b$ and $\rho_s$ values via $\Pi=100\times[(\rho_s-\rho_b)/\rho_s]$.

Scanning electron microscopy: SEM images were captured from Au/Pd (60/40) coated samples on a Hitachi Model S-4700 field emission microscope.

Thermal conductivity: The total thermal conductivities of all samples were calculated at 23° C. via $k=R\times c_p\times\rho_b$, as has been described recently [15]. The thermal diffusivity, R, of each sample was determined at room temperature and atmospheric pressure with a Netzsch NanoFlash Model LFA 447 flash diffusivity instrument using disk samples (~1 cm in diameter, 2-3 mm thick) [9, 17].

Oil absorption capability: Two small beakers filled with engine oil (Castrol Ltd., Liverpool, UK) were prepared. The samples were lowered into the beakers, then allowed to soak for an allotted time period. The samples were then removed from the beaker and placed in Petri dishes, where they sat to dry for 1 min. After this drying interval, the samples were squeezed, and then were placed back into the oil.

TABLE 1

Amounts used for sol preparation of regular aerogel and aerogel foams (total vol. 90 mL).

| Material | Volume (mL) | Mass (g) |
|---|---|---|
| Desmodur N3300A | 10.91 | 12.77 |
| Ethylene Glycol | 2.12 | 2.48 |
| Acetonitrile | 57.72 | 45.36 |
| Acetone | 19.12 | 15.12 |
| Dibutylin Dilaurate | 0.13 | 0.13 |

TABLE 2

General material properties of regular PIR-PUR and aerogel foams[a].

| Name | Bulk Density ($\rho_b$, g/cm$^3$) | Skeletal Density ($\rho_s$, g/cm$^3$) | Linear Shrinkage[b] (%) | Porosity[c] (%) |
|---|---|---|---|---|
| Regular Aerogel (PIR-PUR) | 0.345 ± 0.009 | 1.215 ± 0.003 | 19.40 | 71.60 |
| Aerogel Foam (PIR-PUR-P-1) | 0.250 ± 0.007 | 1.244 ± 0.003 | 20.55 | 79.90 |
| Aerogel Foam (PIR-PUR-P-2) | 0.263 ± 0.014 | 1.240 ± 0.003 | 20.68 | 78.83 |
| Aerogel Foam (PIR-PUR-P-3) | 0.247 ± 0.002 | 1.236 ± 0.002 | 20.77 | 80.02 |

[a]Average of three measurements.
[b]Linear Shrinkage = 100 × [(Mold diameter − Sample diameter)/Mold diameter].
[c]Porosity = 100 × [($\rho_s$ − $\rho_b$)/$\rho_s$]

depressurization step, totaling approximately 45 min. The samples were then washed successively twice with acetone, acetonitrile, and finally pentane for a period of 8 h in each bath. Pentane-filled wet-gels were allowed to dry at room temperature and pressure for 24 h. The resulting aerogels were cured in a convection oven at 50° C. for 2 h. A 5 mL aliquot of each sol was set aside in an unpressurized clear syringe and was left for gelation. These control samples were processed in the same way as the aerogel foams.

TABLE 3

Thermal diffusivity and thermal conductivity of a regular PIR-PUR aerogel and aerogel foams at room temperature

| Name | Thermal diffusivity, (mm$^2$ s$^{-1}$) | Thermal conductivity, (W m$^{-1}$ K$^{-1}$) |
|---|---|---|
| Regular Aerogel (PIR-PUR) | 0.177 ± 0.006 | 0.104 ± 0.006 |
| Aerogel Foam | 0.192 ± 0.001 | 0.082 ± 0.010 |

TABLE 3-continued

Thermal diffusivity and thermal conductivity of a regular
PIR-PUR aerogel and aerogel foams at room temperature

| Name | Thermal diffusivity, (mm² s⁻¹) | Thermal conductivity, (W m⁻¹ K⁻¹) |
|---|---|---|
| (PIR-PUR-P1) | | |
| Aerogel Foam (PIR-PUR-P2) | 0.169 ± 0.011 | 0.076 ± 0.007 |
| Aerogel Foam (PIR-PUR-P3) | 0.175 ± 0.008 | 0.074 ± 0.005 |

REFERENCES

[1] A. C. Pierre, History of Aerogels, in: Aerogels Handbook, Springer New York, N. Y., N. Y., 2011: pp. 3-18. https://doi.org/10.1007/978-1-4419-7589-8_1.

[2] A. C. Pierre, A. Rigacci, SiO2 Aerogels, in: Aerogels Handb., Springer New York, N. Y., N. Y., 2011: pp. 21-45. https://doi.org/10.1007/978-1-4419-7589-8_2.

[3] A. M. Kraynik, M. K. Neilsen, Elastic Behavior of Cellular Solids, in: Encycl. Mater. Sci. Technol., Elsevier, 2001: pp. 2387-2389. https://doi.org/10.1016/bO-08-043152-6/00421-6.

[4] G. Wypych, INTRODUCTION, in: Handb. Foam. Blowing Agents, Elsevier, 2017: pp. 1-2. https://doi.org/10.1016/b978-1-895198-99-7.50003-9.

[5] N. Teo, S. C. Jana, Open Cell Aerogel Foams via Emulsion Templating, Langmuir. 33 (2017) 12729-12738. https://doi.org/10.1021/acs.langmuir.7b03139.

[6] N. Leventis, S. Mulik, X. Wang, A. Dass, V. U. Patil, C. Sotiriou-Leventis, H. Lu, G. Churu, A. Capecelatro, Polymer nano-encapsulation of templated mesoporous silica monoliths with improved mechanical properties, J. Non. Cryst. Solids. 354 (2008) 632-644. https://doi.org/10.1016/j.jnoncrysol.2007.06.094.

[7] N. Teo, Z. Gu, S. C. Jana, Polyimide-based aerogel foams, via emulsion-templating, Polymer. 157 (2018) 95-102. https://doi.org/10.1016/j.polymer.2018.10.030.

[8] S. Gu, S. C. Jana, Open cell aerogel foams with hierarchical pore structures, Polymer. 125 (2017) 1-9. https://doi.org/10.1016/j.polymer.2017.07.085.

[9] C. Chidambareswarapattar, P. M. McCarver, H. Luo, H. Lu, C. Sotiriou-Leventis, N. Leventis, Fractal Multiscale Nanoporous Polyurethanes: Flexible to Extremely Rigid Aerogels from Multifunctional Small Molecules, Chem. Mater. 25 (2013) 3205-3224. https://doi.org/10.1021/cm401623h.

[10] S. Donthula, C. Mandal, T. Leventis, J. Schisler, A. M. Saeed, C. Sotiriou-Leventis, N. Leventis, Shape Memory Superelastic Poly(isocyanurate-urethane) Aerogels (PIR-PUR) for Deployable Panels and Biomimetic Applications, Chem. Mater. 29 (2017) 4461-4477. https://doi.org/10.1021/acs.chemmater.7b01020.

[11] S. Donthula, C. Mandal, J. Schisler, T. Leventis, M. A. B. Meador, C. Sotiriou-Leventis, N. Leventis, Nanostructure-Dependent Marcus-Type Correlation of the Shape Recovery Rate and the Young's Modulus in Shape Memory Polymer Aerogels, ACS Appl. Mater. Interfaces. 10 (2018) 23321-23334. https://doi.org/10.1021/acsami.8b06234.

[12] T. Taghvaee, S. Donthula, P. M. Rewatkar, H. Majedi Far, C. Sotiriou-Leventis, N. Leventis, K-Index: A Descriptor, Predictor, and Correlator of Complex Nano-morphology to Other Material Properties, ACS Nano. 13 (2019) 3677-3690. https://doi.org/10.1021/acsnano.9b00396.

[13] ImageJ, https://imagej.nih.gov/ij/(accessed Apr. 20, 2020).

[14] S. Min, J. Blumm, A. Lindemann, A new laser flash system for measurement of the thermophysical properties, Thermochim. Acta. 455 (2007) 46-49. https://doi.org/10.1016/j.tca.2006.11.026.

[15] S. Malakooti, G. Qin, C. Mandal, R. Soni, T. Taghvaee, Y. Ren, H. Chen, N. Tsao, J. Shiao, S. S. Kulkarni, C. Sotiriou-Leventis, N. Leventis, H. Lu, Low-Cost, Ambient-Dried, Superhydrophobic, High Strength, Thermally Insulating, and Thermally Resilient Polybenzoxazine Aerogels, ACS Appl. Polym. Mater. 1 (2019) 2322-2333. https://doi.org/10.1021/acsapm.9b00408.

[16] K. Sakai, Y. Kobayashi, T. Saito, A. Isogai, Partitioned airs at microscale and nanoscale: Thermal diffusivity in ultrahigh porosity solids of nanocellulose, Sci. Rep. 6 (2016) 1-7. https://doi.org/10.1038/srep20434.

[17] D. P. Mohite, S. Mahadik-Khanolkar, H. Luo, H. Lu, C. Sotiriou-Leventis, N. Leventis, Polydicyclopentadiene aerogels grafted with PMMA: II. Nanoscopic characterization and origin of macroscopic deformation, Soft Matter. 9 (2013) 1531-1539. https://doi.org/10.1039/C2SM27606B.

While specific embodiments of the present inventive concept have been shown and described, it will be understood that other modifications, substitutions and alternatives are apparent to one of ordinary skill in the art. Such modifications, substitutions and alternatives can be made without departing from the spirit and scope of the inventive concept, which should be determined from the appended claims.

That which is claimed:

1. A method of preparing an aerogel foam comprising:
   subjecting a sol formulation suitable for forming an aerogel to pressure; and
   gradually depressurizing the sol formulation over time,
   to provide an aerogel foam comprising a hierarchical porosity.

2. The method of claim 1, wherein the aerogel foam is prepared in an absence of chemical foaming agents, prefabricated templates, supercritical fluids, sacrificial chemicals, or any combination thereof.

3. The method of claim 1, wherein the sol formulation is free of chemical foaming agents, prefabricated templates, supercritical fluids, sacrificial chemicals, or any combination thereof.

4. The method of claim 1, wherein the pressure is about 4 to about 10 bar.

5. The method of claim 1, wherein the sol formulation comprises an aliphatic triisocyanate and ethylene glycol as gelation monomers.

6. The method of claim 1, wherein the sol formulation comprises dibutylin dilaurate (DBTDL) as a polymerization catalyst.

7. The method of claim 1, further comprising performing at least one solvent exchange after gradually depressurizing the sol formulation.

8. The method of claim 7, wherein the aerogel foam is dried after the at least one solvent exchange.

9. The method of claim 8, wherein the aerogel foam is dried in an absence of supercritical fluids.

10. The method of claim 1, wherein gradually depressurizing the sol formulation comprises stepwise depressurization of the sol formulation.

11. The method of claim 10, wherein the sol formulation is depressurized by about an equal amount in each step.

12. The method of claim 1, wherein the aerogel foam has a thermal conductivity of less than about 0.1 $Wm^{-1}K^{-1}$.

* * * * *